United States Patent [19]

Bonner et al.

[11] Patent Number: 5,531,372
[45] Date of Patent: Jul. 2, 1996

[54] MOISTURE-FREE ATMOSPHERE BRAZING OF FERROUS METALS

[75] Inventors: Brian B. Bonner, Nesquehoning; Diwakar Garg, Emmaus; Kerry R. Berger, Lehighton, all of Pa.

[73] Assignee: Air Products And Chemicals, Inc., Allentown, Pa.

[21] Appl. No.: 298,004

[22] Filed: Aug. 30, 1994

[51] Int. Cl.$^6$ ............................................. B23K 1/008
[52] U.S. Cl. ............................................. 228/220
[58] Field of Search ..................... 228/220, 219, 228/262.42

[56] References Cited

U.S. PATENT DOCUMENTS 2,085,587  6/1937  Hotchkiss ............................... 228/220
4,294,395  10/1981  Nayar ..................................... 228/220

OTHER PUBLICATIONS

*Metals Handbook*, vol. 6, Ninth Ed. pp. 934–935.

*Primary Examiner*—Kenneth J. Ramsey
*Attorney, Agent, or Firm*—James C. Simmons

[57] ABSTRACT

The present invention discloses a novel, moisture-free atmosphere for brazing carbon steels that provides good braze flow and brazed joint quality with minimum or no formation of soot on brazed joints. According to the present invention, carbon steels are brazed in continuous furnaces using a moisture-free atmosphere containing a mixture of three gases including nitrogen, hydrogen, and carbon dioxide. The key features of the invention involve (1) formation of moisture, which is needed to facilitate braze flow and to minimize formation of soot on brazed joints, in-situ in the heating zone of the furnace by the reaction between hydrogen and carbon dioxide and (2) reduction in the overall amount of a reducing gas required for brazing carbon steels by keeping moisture out of the cooling zone. The use of a moisture-free three gas atmosphere has been unexpectedly found to (1) eliminate the need of an expensive and difficult to control external humidification system, (2) provide flexibility in adjusting moisture content of the atmosphere in the heating zone of the furnace simply by adjusting the flow rate of hydrogen or carbon dioxide or both, and (3) facilitate rapid conditioning of the furnace by keeping moisture out of the cooling zone. The moisture-free atmosphere has also been unexpectedly found to provide good braze flow, fillet formation, and brazed joint quality while minimizing or eliminating formation of soot on brazed joints.

7 Claims, No Drawings

MOISTURE-FREE ATMOSPHERE BRAZING OF FERROUS METALS

TECHNICAL FIELD OF THE INVENTION

The present invention pertains to brazing of ferrous metal parts.

BACKGROUND OF THE INVENTION

The brazing of ferrous metals (e.g., carbon steel components) involves joining surfaces of ferrous metals with brazing pastes or preforms. The brazing pastes or preforms generally contains a metal or a mixture of metals and an organic (or hydrocarbon) binder. The melting point of metal or mixture of metals in brazing pastes or preforms generally is substantially lower than that of the base carbon steel components. The components are joined by juxtaposing them with the brazing paste or preform adjacent to or between them, and heating to a temperature that will effect melting of the brazing metal or mixture of metals without melting the components.

The function of organic or hydrocarbon binder is to serve as a vehicle for metal or a mixture of metals. It generally consists of pure or mixtures of low-boiling point organic or hydrocarbon compounds such as glycols and ethers. These compounds are thermally dissociated and removed from joints while heating components to be brazed to brazing temperatures.

For example, carbon steel components are generally brazed in the presence of nitrogen-based atmospheres containing controlled amounts of a reducing gas such as hydrogen and an oxidant such as moisture. The function of a reducing gas is to keep the surface of carbon steel components from oxidizing and also to maintain reducing potential in both the heating and cooling zones of the furnace. The functions of an oxidant are to help in regulating braze flow and in removing the organic binder from the braze material and to prevent formation of soot on brazed joints. The use of high concentration of a reducing gas in the atmosphere is known to cause overflow of brazing material, resulting in poor quality of brazed joints. The use of low or insufficient concentration of an oxidant is known to result in the formation of soot on brazed joints. Likewise, the use of low concentration of a reducing gas or high concentration of an oxidant is known to oxidize the braze material and components, resulting in poor braze flow and brazed joint quality and unacceptable appearance of brazed components. Therefore, it is critical to carefully select concentrations of both a reducing gas and an oxidant in the brazing atmosphere to (1) minimize overflow and underflow of braze material, (2) maintain reducing potential in the furnace, (3) assist in breaking down organic binder, and (4) prevent formation of soot on brazed joints.

The importance of controlling concentrations of hydrogen and moisture in the humidified nitrogen-hydrogen atmosphere has been described in detail in a paper titled "The Effect of Atmosphere Composition on Braze Flow" presented by Air Products and Chemicals Inc. at the 14th Annual AWSANRC Brazing and Soldering Conference held in Philadelphia, Pa. on 26–28 Apr., 1983. The teachings of this paper are incorporated here by reference.

The humidified nitrogen-hydrogen atmospheres in theory provide brazing companies ultimate freedom in terms of selecting concentrations of both the reducing gas and moisture. They also provide brazing companies ultimate flexibility in changing the overall flow rate and composition of the brazing atmosphere. However, in practice, they do not provide brazing companies means of precisely changing or controlling the concentration of moisture in the atmosphere. Often humidifiers used to add moisture in the nitrogen-based atmospheres are either too expensive or sized improperly to meet ever-changing atmosphere needs of the brazing companies. Furthermore, since a part of these atmospheres travels toward the cooling zone of the furnace and exits the furnace through the opening in the discharge vestibule, they require high concentration of hydrogen to maintain reducing potential in the cooling zone.

U.S. Pat. No. 4,450,017 discloses the use of a moisture-free nitrogen-based atmosphere for decarburize annealing carbon steels. It exposes the metal to be decarburize to a moisture-free atmosphere containing 1–50% carbon dioxide, 1–20% hydrogen, and the balance being nitrogen to a temperature close to the ferrite-austenite transition temperature of about 927° C. This patent does not teach anything about (1) forming moisture in-situ in the heating zone of the furnace by reaction between hydrogen and carbon dioxide and (2) using moisture-free atmosphere for brazing carbon steels at a temperature above about 1,080° C.

SUMMARY OF THE INVENTION

The present invention relates to processes for moisture-free atmosphere brazing of ferrous metals, e.g., carbon steels, that provides good braze flow and brazed joint quality with minimum or no formation of soot on brazed joints. The processes permit brazing of ferrous metals (e.g., carbon steel) components in continuous furnaces using a moisture-free atmosphere containing a mixture of three gases including nitrogen, hydrogen, and carbon dioxide. The moisture needed to provide good braze flow and brazed joint quality as well as to minimize or eliminate formation of soot on brazed joints is formed in-situ in the heating zone of the furnace by the reaction between hydrogen and carbon dioxide. The use of a moisture-free three gas atmosphere has been unexpectedly found to (1) eliminate need of an expensive and difficult to control external humidification system, (2) provide flexibility in adjusting moisture content of the atmosphere in the heating zone of the furnace simply by adjusting the flow rate of hydrogen or carbon dioxide or both, and (3) facilitate rapid conditioning of the furnace by keeping moisture out of the cooling zone. The moisture-free atmosphere has also been unexpectedly found to provide good braze flow, fillet formation, and brazed joint quality while minimizing or eliminating soot formation on brazed joints.

According to one aspect of the present invention, carbon steel components are brazed in a continuous furnace operated above about 1,080° C. using a gaseous mixture of nitrogen, hydrogen, and carbon dioxide. The concentrations of hydrogen and carbon dioxide in the moisture-free gaseous feed gas are controlled in such a way that they facilitate formation of the desired amount of moisture in the heating zone of the furnace and provide the desired reducing potential both in the heating and cooling zones of the furnace.

DETAILED DESCRIPTION OF THE INVENTION

Nitrogen-based brazing atmospheres needed for brazing of ferrous metals (e..g, carbon steel components) are generally supplied either by producing them on-site using exothermic generators or by humidifying blends of pure nitrogen and hydrogen. The exothermically generated nitrogen-based atmospheres generally contain a mixture of nitrogen, hydrogen, carbon dioxide, carbon monoxide, and trace amounts of oxygen and hydrocarbons. These atmospheres are introduced into the continuous furnace through an inlet port in the transition zone, which is located between the heating and cooling zones of the furnace. A part of these atmospheres travels toward the heating zone and exits the furnace through the opening in the feed vestibule. The remaining part travels toward the cooling zone and exits the furnace through the opening in the discharge vestibule. Since it is difficult to (1) change and precisely control the composition of exothermically generated nitrogen-based atmosphere and (2) change overall flow rate, brazing companies prefer the use of humidified blends of nitrogen and hydrogen. These nitrogen-hydrogen blends in theory provide brazing companies ultimate freedom in terms of selecting the concentrations of both reducing gas and moisture. They also provide ultimate flexibility in changing the overall flow rate and composition of the brazing atmosphere. However, in practice, they do not provide brazing companies means of precisely changing or controlling the concentration of moisture in the atmosphere. Often humidifiers used to add moisture in the nitrogen-based atmosphere are either too expensive or sized improperly to meet ever-changing atmosphere needs of the brazing companies. Furthermore, since a part of these atmospheres travels toward the cooling zone and exits the furnace through the opening in the discharge vestibule, they require high concentration of hydrogen to maintain reducing potential in the cooling zone. Therefore, there is a need to develop a nitrogen-based atmosphere that eliminates the use of a humidifier, provides brazing companies an economical means of changing and precisely controlling the moisture level in the heating zone of a brazing furnace, and makes economical use of hydrogen gas.

The amount of hydrogen gas required for brazing can be reduced by using two or more feed gas inlet ports, with at least one port each located in the heating and cooling zones. This kind of arrangement will provide means of introducing humidified nitrogen-hydrogen atmosphere in the heating zone and dry nitrogen-hydrogen atmosphere in the cooling zone, thereby keeping moisture out of the cooling zone and facilitating economical use of hydrogen. This arrangement, however, requires delicate instruments to balance the furnace and to prevent air from infiltrating the furnace. Furthermore, this arrangement still requires an expensive and difficult to control humidifier.

It is believed that the amount of hydrogen gas required for brazing can be reduced and the need of an expensive and difficult to control humidifier can be eliminated at the same time provided moisture needed for the brazing operation is formed in-situ in the heating zone of the furnace. It is also believed that the formation of moisture in-situ in the heating zone will provide brazing companies ultimate freedom in terms of selecting concentrations of both reducing gas and moisture.

It has surprisingly been found that the amount of hydrogen gas required for brazing is reduced and the need of an expensive and difficult to control humidifier is eliminated at the same time by using a moisture-free mixture of three gases including nitrogen, hydrogen, and carbon dioxide. The gaseous mixture, according to the present invention, is introduced into the furnace through an inlet port located in the transition zone. A part of the feed gas travels toward the heating zone and exits the furnace through the opening in the feed vestibule. While traveling through the heating zone, some of the carbon dioxide present in the feed gas reacts with hydrogen following the reaction described below, forming moisture required for brazing carbon steels. The $$CO_2 + H_2 \rightarrow CO + H_2O$$

amount of moisture formed in-situ in the heating zone of the furnace depends upon the concentration of both carbon dioxide and hydrogen present in the feed gas. It can be varied by changing the flow rate of carbon dioxide, or hydrogen, or both. It also depends greatly upon the operating temperature of the furnace. It is, therefore, critical to maintain a certain minimum temperature in the furnace.

The remaining part of the feed gas travels toward the cooling zone and exits the furnace through the opening in the discharge vestibule. Since this part of feed gas does not contain moisture and the temperature in the cooling zone is not high enough to facilitate reaction between hydrogen and carbon dioxide, the cooling zone is isolated from moisture containing gases. It helps in reducing both the amount of hydrogen required to maintain reducing potential in the cooling zone and the time required to condition the furnace.

The amount of moisture required for brazing ferrous metal components depends upon the nature and type of brazing paste or preform used during the brazing operation. Some brazing pastes require atmospheres that contain high dew point (high moisture content); whereas, others require either medium or low dew points (medium or low moisture contents). Generally speaking, brazing pastes containing nickel require low dew point (low moisture content) atmospheres. Brazing pastes requiring low dew point or low moisture content are generally preferred for brazing steel components where it is critical to maintain carbon level in the base metal. The atmospheres disclosed in the present invention are suitable for brazing carbon steel components both with low and high dew point brazing pastes.

The present invention, therefore, discloses a novel, moisture-free atmosphere for brazing carbon steels that provides good braze flow and brazed joint quality with minimum or no formation of soot on brazed joints. According to the present invention, carbon steels are brazed in continuous furnaces using a moisture-free atmosphere containing a mixture of three gases including nitrogen, hydrogen, and carbon dioxide. The concentrations of hydrogen and carbon dioxide in the moisture-free gaseous feed gas are controlled in such a way that they facilitate formation of the desired amount of moisture in the heating zone of the furnace and provide the desired reducing potential both in the heating and cooling zones of the furnace.

Nitrogen required for brazing operation is pure and contains less than 10 ppm residual oxygen content. It can be supplied by producing it using well known cryogenically distillation technique. It can alternatively be supplied by purifying non-cryogenically generated nitrogen. Hydrogen gas can be supplied by producing it on-site using an ammonia disssociator. It can also be supplied in gaseous form in compressed gas cylinders or vaporizing liquefied hydrogen. Carbon dioxide can be supplied in gaseous form in compressed gas cylinders or vaporized liquid form.

According to the present invention, ferrous metals, e.g., carbon steel components, are brazed in a continuous furnace operated above about 1,080° C. using a moisture-free three gas mixture containing nitrogen, hydrogen, and carbon dioxide. The flow rates of hydrogen and carbon dioxide are controlled to provide a hydrogen to carbon dioxide ratio of at least 1.0 in the gaseous feed mixture. Furthermore, they are controlled in such a way that they produce in-situ the desired amount of moisture and provide a hydrogen to moisture ratio greater than 2.0 in the heating zone of the furnace.

The following examples are provided to illustrate various embodiments of the invention and are not intended to restrict the scope thereof.

A number of experiments were carried out in a Watkins-Johnson continuous conveyor belt furnace operated at about 1,100° C. to braze 1010 carbon steel components. The furnace consisted of an 8.75 in. wide, about 4.9 in. high, and 86 in. long heating zone and a 90 in. long cooling zone. A flexible conveyor belt with a fixed belt speed of 5 in per minute was used to feed carbon steel components into the furnace for brazing in all the experiments. A total flow rate of about 350 SCFH of mixture of nitrogen and carbon dioxide, nitrogen and hydrogen, humidified nitrogen and hydrogen, or nitrogen, hydrogen, and carbon dioxide was introduced into the transition zone of the furnace to develop moisture-free atmosphere for brazing carbon steel components.

Several gas samples were taken from the heating and cooling zones to monitor and regulate the composition of atmosphere present in the heating and cooling zones of the furnace. Specifically, the flow rates of both hydrogen and carbon dioxide in the feed gas were regulated to provide the desired moisture content and reducing potential in the heating zone and the desired reducing potential in the cooling zone of the furnace.

A commercially available brazing paste CNG-1900-750 requiring high dew point atmosphere was used in most of the brazing experiments. It was supplied by Fusion, Inc. of Willoughby, Ohio. An experimental nickel containing brazing paste 21 2D requiring low dew point atmosphere was also used in brazing experiments. It was supplied by SCM Metal Products, Inc. of Research Park Triangle, N.C.

The quality of brazed joints were determined either visually or by cross-sectioning and analyzing them.

EXAMPLE 1

Flat strips of 1010 carbon steels were brazed with commercially available (Fusion, Inc.) and experimental (SCM Metal Products, Inc.) brazing pastes in the Watkins Johnson continuous belt furnace operated at 1,100° C. using pure and dry (dew point less than −55° C.) mixture of nitrogen and hydrogen atmosphere containing 4.0 vol. % hydrogen. The use of commercially available brazing paste resulted in unacceptable brazed joints with heavy sooting and very minimal braze flow. The use of experimental paste also resulted in unacceptable brazed joints with excessive braze flow and medium to heavy soot formation. It is, therefore, clear that a pure and dry mixture of nitrogen and hydrogen cannot be used for brazing carbon steel components.

EXAMPLE 2

The brazing procedure described in Control Example 1 was repeated using similar furnace, brazing temperature, components, and brazing pastes. However, pure and dry mixture of nitrogen and carbon dioxide (oxidant) atmosphere containing 1.5 vol. % carbon dioxide was used instead of using a mixture of pure and dry nitrogen and hydrogen. The results of this experiment visually showed brazed joints with good braze flow both with commercially available and experimental brazing pastes. However, the use of a mixture of pure and dry nitrogen and carbon dioxide resulted in medium to heavy soot formation on brazed joints with presence of carbon particles in brazed joints. This atmosphere mixture also resulted in oxidizing the base material, as evidenced by the presence of bluish film on the surface of carbon steel components. This example, therefore, showed that a mixture of nitrogen and an oxidant cannot be used to braze carbon steel components.

EXAMPLE 3

The brazing procedure described in Control Example 1 was repeated several times using similar furnace, brazing temperature, components, and brazing pastes. A mixture of humidified nitrogen and hydrogen gas with varying moisture and hydrogen contents was used in these experiments instead of using a mixture of pure and dry nitrogen and hydrogen.

EXAMPLE 3A

The brazing experiment carried out with 0.2% moisture and 3.8% hydrogen in the humidified nitrogen and hydrogen feed atmosphere showed brazed joints with excessive and unacceptable braze flow both with commercially available and experimental brazing pastes. The use of commercially available brazing paste resulted in medium to heavy soot formation on brazed joints, indicating that the amount of moisture present in the atmosphere was not high enough to eliminate soot formation. The use of experimental paste, on the other hand, did not show formation of any soot on brazed joints, indicating that the amount of moisture present in the atmosphere was high enough to eliminate soot formation. These experiments, therefore, showed that the use of 0.2% moisture in the nitrogen-hydrogen atmosphere was not high enough to braze carbon steel components with good brazed joints quality with commercially available brazing paste. They also showed that the use of a hydrogen to moisture ratio of 19.0 in the feed gas was too high to braze carbon steel components with good brazed joints quality with experimental brazing paste requiring low dew point atmosphere.

EXAMPLE 3B

The brazing experiment carried out with 0.4% moisture and 3.6% hydrogen in the humidified nitrogen and hydrogen feed atmosphere showed brazed joints with acceptable braze flow and brazed joints quality both with commercially available and experimental brazing pastes. The use of this atmosphere composition also resulted in little or no soot formation on brazed joints. These experiments, therefore, showed that a moisture level greater than 0.2% and a hydrogen to moisture ratio less than 19.0 were required in the humidified nitrogen-hydrogen atmosphere to braze carbon steel components with acceptable braze flow and brazed joints quality.

EXAMPLE 3C.

The brazing experiment carried out with 0.6% moisture and 3.4% hydrogen in the humidified nitrogen and hydrogen feed atmosphere showed brazed joints with acceptable braze flow and brazed joints quality both with commercially available and experimental brazing pastes. The use of this atmosphere composition resulted in very little or no soot formation on brazed joints. These experiments, therefore, confirmed that a moisture level greater than 0.2% and a hydrogen to moisture ratio less than 19.0 were required in the humidified nitrogen-hydrogen atmosphere to braze carbon steel components with acceptable braze flow and brazed joints quality.

EXAMPLE 3D

The brazing experiment carried out with 0.8% moisture and 3.2% hydrogen in the humidified nitrogen and hydrogen feed atmosphere showed brazed joints with acceptable braze flow and brazed joints quality both with commercially available and experimental brazing pastes. The use of this atmosphere composition resulted in no soot formation on brazed joints. These experiments, therefore, confirmed that a moisture level greater than 0.2% and a hydrogen to moisture ratio less than 19.0 were required in the humidified nitrogen-hydrogen atmosphere to braze carbon steel components with acceptable braze flow and brazed joints quality.

EXAMPLE 3E

The brazing experiment carried out with 1.0% moisture and 3.0% hydrogen in the humidified nitrogen and hydrogen feed atmosphere showed brazed joints with acceptable braze flow and brazed joints quality both with commercially available and experimental brazing pastes. The use of this atmosphere composition resulted in no soot formation on brazed joints. The ratio of hydrogen to moisture present in the humidified nitrogen-hydrogen atmosphere (hydrogen to moisture ratio of 3.0) was high enough to yield brazed components with bright, unoxidized surface finish. These experiments showed that a moisture level greater than 0.2% and a hydrogen to moisture ratio less than 19.0 were required in the humidified nitrogen-hydrogen atmosphere to braze carbon steel components with acceptable braze flow and brazed joints quality.

EXAMPLE 3F

The brazing experiment carried out with 1.0% moisture and 2.0% hydrogen in the humidified nitrogen and hydrogen feed atmosphere showed brazed joints with acceptable braze flow and brazed joints quality both with commercially available and experimental brazing pastes. The use of this atmosphere composition resulted in no soot formation on brazed joints. However, the use of this atmosphere resulted in brazed components with oxidized surface finish, indicating that a ratio of hydrogen to moisture of 2.0 was not high enough to yield brazed components with bright, unoxidized surface finish. These experiments showed that a moisture level greater than 0.2% and a hydrogen to moisture ratio less than 19.0 but more than 2.0 were required in the humidified nitrogen-hydrogen atmosphere to braze carbon steel components with acceptable braze flow, brazed joints quality, and surface finish.

The foregoing examples showed that carbon steel components cannot be brazed in pure and dry mixture of nitrogen and hydrogen or nitrogen and carbon dioxide. They also showed that, for the pastes used, a moisture level greater than 0.2% and a hydrogen to moisture level less than 19.0 but greater that 2.0 are required in humidified nitrogen-hydrogen atmospheres for brazing carbon steel components.

EXAMPLE 4

The brazing procedure described in Example 1 was repeated several times using similar furnace, brazing temperature, components, and brazing pastes to demonstrate the present invention. A mixture of moisture-free nitrogen, hydrogen, and carbon dioxide was used in these experiments instead of using mixture of dry nitrogen and hydrogen or nitrogen and carbon dioxide or humidified nitrogen and hydrogen.

EXAMPLE 4A

This example describes results obtained by carrying out a brazing experiment using a moisture-free nitrogen-based atmosphere containing 0.2% carbon dioxide and 4% hydrogen. Gas sample taken from the cooling zone with the introduction of 0.2% carbon dioxide and 4.0% hydrogen along with nitrogen into the furnace through transition zone showed only a marginal change in the composition of the part of the atmosphere flowing through the cooling zone. Gas sample taken from the heating zone, on the other hand, showed a dramatic change in the composition of the part of the atmosphere flowing through it. Specifically, a part of carbon dioxide present in the atmosphere reacted with hydrogen and produced in-situ moisture following the reaction described earlier. More specifically, the heating zone atmosphere was found to contain close to 0.12% moisture and a hydrogen to moisture ratio of approximately 33. This in-situ produced atmosphere resulted in brazed joints with poor and unacceptable braze flow and the formation of medium to heavy soot on brazed joints with commercially available brazing paste. It also resulted in unacceptable brazed joints with excessive braze flow and slight soot formation with experimental brazing paste. The above information indicated that the amount of carbon dioxide present in the feed moisture-free gaseous mixture was too low to produce enough moisture in the heating zone of the furnace to provide acceptable brazed joints and to eliminate soot formation with commercially available brazing paste. Furthermore the ratio of hydrogen to carbon dioxide in the feed gas (~20) was too high and too reducing to provide acceptable braze flow with experimental brazing paste requiring low dew point atmosphere.

This example, therefore, showed that the use of hydrogen to carbon dioxide ratio close to 20 in the moisture-free nitrogen, hydrogen, and carbon dioxide atmosphere was not desirable to braze carbon steel components with good braze flow and brazed joints quality with both commercially available and experimental brazing pastes.

EXAMPLE 4B

This example describes results obtained by carrying out a brazing experiment using a moisture-free nitrogen-based atmosphere containing 0.4% carbon dioxide and hydrogen. Gas sample taken from the cooling zone with the introduction of 0.4% carbon dioxide and 4.0% hydrogen along with nitrogen into the furnace through transition zone once again showed only a marginal change in the composition of the part of the atmosphere flowing through the cooling zone. Gas sample taken from the heating zone showed the presence of 0.25% moisture and a hydrogen to moisture ratio close to 15. This in-situ produced atmosphere resulted in brazed joints with unacceptable braze flow and the formation of medium to heavy soot with commercially available brazing paste. It resulted in brazed joints with no soot formation and marginally acceptable braze flow with experimental brazing paste. The above information indicated that the amount of carbon dioxide present in the feed moisture-free gaseous mixture was still too low to produce enough moisture in the heating zone of the furnace and eliminate soot formation with commercially available brazing paste. However, both the amount of carbon dioxide and ratio of hydrogen to carbon dioxide in the feed gas of 10 were good enough to provide acceptable braze flow and brazed joints quality with experimental brazing paste.

This example showed that the use of hydrogen to carbon dioxide ratio close to 10 in the moisture-free nitrogen, hydrogen, and carbon dioxide atmosphere was not desirable to braze carbon steel components with good braze flow and brazed joints quality with commercially available brazing paste. It was, however, good enough to provide acceptable braze flow and brazed joints quality with experimental brazing paste requiring low-dew point atmosphere.

EXAMPLE 4C

This example describes results obtained by carrying out a brazing experiment using a moisture-free nitrogen-based atmosphere containing 0.6% carbon dioxide and 4% hydrogen. Gas sample taken from the cooling zone with the introduction of 0.6% carbon dioxide and 4.0% hydrogen along with nitrogen into the furnace through transition zone once again showed only a marginal change in the composition of the part of the atmosphere flowing through the cooling zone. Gas sample taken from the heating zone showed the presence of 0.30% moisture and a hydrogen to moisture ratio close to 10. This in-situ produced atmosphere resulted in brazed joints with acceptable braze flow and brazed joint quality with marginal soot formation with commercially available brazing paste. It resulted in good braze flow and brazed joint quality with no soot formation with experimental brazing paste. The above information indicated that the amount of carbon dioxide present in the feed moisture-free gaseous mixture was still too low to produce enough moisture in the heating zone of the furnace and eliminate soot formation with commercially available brazing paste. However, both the amount of carbon dioxide and ratio of hydrogen to carbon dioxide in the feed gas of 6.67 were good enough to provide good braze flow and brazed joints quality with experimental brazing paste.

This example, therefore, showed that the use of hydrogen to carbon dioxide ratio close to 6.67 in the moisture-free nitrogen, hydrogen, and carbon dioxide atmosphere was not desirable to braze carbon steel components with good braze flow and brazed joints quality with commercially available brazing paste. It was, however, good enough to provide good braze flow and brazed joints quality with experimental brazing paste.

EXAMPLE 4D

This example describes results obtained by carrying out a brazing experiment using a moisture-free nitrogen-based atmosphere containing 0.8% carbon dioxide and 4% hydrogen. Gas sample taken from the cooling zone with the introduction of 0.8% carbon dioxide and 4.0% hydrogen along with nitrogen into the furnace through transition zone once again showed only a marginal change in the composition of the part of the atmosphere flowing through the cooling zone. Gas sample taken from the heating zone showed the presence of 0.43% moisture and a hydrogen to moisture ratio close to 7. This in-situ produced atmosphere resulted in brazed joints with good braze flow and brazed joint quality and with no soot formation both with commercially available and experimental brazing pastes.

This example showed that the use of hydrogen to carbon dioxide ratio close to 5.0 in the moisture-free nitrogen, hydrogen, and carbon dioxide atmosphere was desirable to braze carbon steel components with good braze flow and brazed joints quality with commercially available and experimental brazing pastes.

EXAMPLE 4E

This example describes results obtained by carrying out a brazing experiment using a moisture-free nitrogen-based atmosphere containing 1.0% carbon dioxide and hydrogen. Gas sample taken from the cooling zone with the introduction of 1.0% carbon dioxide and 4.0% hydrogen along with nitrogen into the furnace through transition zone once again showed only a marginal change in the composition of the part of the atmosphere flowing through the cooling zone. Gas sample taken from the heating zone showed the presence of 0.50% moisture and a hydrogen to moisture ratio close to 6. This in-situ produced atmosphere resulted in brazed joints with good braze flow and brazed joint quality and with no soot formation both with commercially available and experimental brazing pastes.

This example showed that the use of hydrogen to carbon dioxide ratio close to 4.0 in the moisture-free nitrogen, hydrogen, and carbon dioxide atmosphere was desirable to braze carbon steel components with good braze flow and brazed joints quality with commercially available and experimental brazing pastes.

EXAMPLE 4F

This example describes results obtained by carrying out a brazing experiment using a moisture-free nitrogen-based atmosphere containing 1.0% carbon dioxide and 3% hydrogen. Gas sample taken from the cooling zone with the introduction of 1.0% carbon dioxide and 3.0% hydrogen along with nitrogen into the furnace through transition zone once again showed only a marginal change in the composition of the part of the atmosphere flowing through the cooling zone. Gas sample taken from the heating zone showed the presence of 0.50% moisture and a hydrogen to moisture ratio close to 5. This in-situ produced atmosphere resulted in brazed joints with good braze flow and brazed joint quality and with no soot formation both with commercially available and experimental brazing pastes.

This example showed that the use of hydrogen to carbon dioxide ratio close to 3.0 in the moisture-free nitrogen, hydrogen, and carbon dioxide atmosphere was high enough to braze carbon steel components with good braze flow and brazed joints quality with commercially available and experimental brazing pastes.

EXAMPLE 4G

This example describes results obtained by carrying out a brazing experiment using a moisture-free nitrogen-based atmosphere containing 1.0% carbon dioxide and 2% hydrogen. Gas sample taken from the cooling zone with the introduction of 1.0% carbon dioxide and 2.0% hydrogen along with nitrogen into the furnace through transition zone once again showed only a marginal change in the composition of the part of the atmosphere flowing through the cooling zone. Gas sample taken from the heating zone showed the presence of 0.43% moisture and a hydrogen to moisture ratio close to 4. This in-situ produced atmosphere resulted in brazed joints with good braze flow and brazed joints quality and with no soot formation both with commercially available and experimental brazing pastes.

This example showed that the use of hydrogen to carbon dioxide ratio close to 2.0 in the moisture-free nitrogen, hydrogen, and carbon dioxide atmosphere was high enough to braze carbon steel components with good braze flow and brazed joints quality with commercially available and experimental brazing pastes.

EXAMPLE 4H

This example describes results obtained by carrying out a brazing experiment using a moisture-free nitrogen-based atmosphere containing 1.0% carbon dioxide and 1.5% hydrogen. Gas sample taken from the cooling zone with the introduction of 1.0% carbon dioxide and 1.5% hydrogen along with nitrogen into the furnace through transition zone once again showed only a marginal change in the composition of the part of the atmosphere flowing through the cooling zone. Gas sample taken from the heating zone showed the presence of 0.30% moisture and a hydrogen to moisture ratio close to 4. This in-situ produced atmosphere resulted in brazed joints with good braze flow and brazed joints quality and with no soot formation both with commercially available and experimental brazing pastes.

This example showed that the use of hydrogen to carbon dioxide ratio close to 1.5 in the moisture-free nitrogen, hydrogen, and carbon dioxide atmosphere was high enough to braze carbon steel components with good braze flow and brazed joints quality with commercially available and experimental brazing pastes.

EXAMPLE 4I

This example describes results obtained by carrying out a brazing experiment using a moisture-free nitrogen-based atmosphere containing 1.0% carbon dioxide and 1.0% hydrogen. Gas sample taken from the cooling zone with the introduction of 1.0% carbon dioxide and 1.0% hydrogen along with nitrogen into the furnace through transition zone once again showed only a marginal change in the composition of the part of the atmosphere flowing through the cooling zone. Gas sample taken from the heating zone showed the presence of 0.25% moisture and a hydrogen to moisture ratio close to 2.7. This in-situ produced atmosphere resulted in brazed joints with good braze flow and brazed joint quality and with slight soot formation with commercially available paste and no soot formation with experimental brazing pastes. However, the brazed components were slightly oxidized.

This example showed that the use of hydrogen to carbon dioxide ratio of 1.0 in the moisture-free nitrogen, hydrogen, and carbon dioxide atmosphere was high enough to braze carbon steel components with good braze flow and brazed joints quality with experimental paste. However, it was not high enough to prevent surface oxidation of brazed components. Therefore, it would not be desirable to use a hydrogen to carbon dioxide ratio of 1.0 in moisture-free nitrogen, hydrogen, and carbon dioxide atmosphere for brazing carbon steel components.

Examples 4D to 4H clearly showed that carbon steel components can be brazed with good braze flow and brazed joint quality and unoxidized surface finish by using a commercially available brazing paste (requiring high dew point atmosphere) and a moisture-free nitrogen-based atmosphere containing a mixture of nitrogen, hydrogen, and carbon dioxide. Examples 4C to 4H showed that carbon steel components can be brazed with good braze flow and brazed joint quality and unoxidized surface finish by using an experimental brazing paste (requiring low dew point atmosphere) and a moisture-free nitrogen-based atmosphere containing a mixture of nitrogen, hydrogen and carbon dioxide. Examples 4A to 4I also showed that both the amount of carbon dioxide and hydrogen must be carefully controlled to provide (1) the desired moisture content in the heating zone of the furnace and (2) the required reducing potential both in the heating and cooling zones of the furnace for brazing carbon steel components with acceptable braze flow, braze joints quality, and unoxidized surface finish. It is, however, important to note that the desired moisture content in the furnace atmosphere will generally depend on the composition and type of brazing paste used for brazing carbon steel components.

Although the present invention discloses the use of moisture-free nitrogen-based atmosphere for brazing carbon steels, similar atmospheres can be used for high temperature (>1,000° C.) glass-to-metal sealing and low temperature (700 to 900° C.) brazing of non-ferrous metals and alloys such as brazing of copper and copper alloys using silver-based brazing materials.

Having thus described our invention, what is desired to be secured by Letters Patent of the United States is set forth in the appended claims.

We claim:

1. A process for brazing ferrous metals assembled for brazing with a brazing paste or preform in a continuous conveyor belt furnace having a transition zone between heating and cooling sections comprising the steps of:

introducing the assembly into the furnace maintained at a temperature of at least 1080° C.;

introducing a mixture of gaseous nitrogen, hydrogen and carbon dioxide into said furnace at the transition zone, said hydrogen being at a minimum of 1% by volume of the mixture with said carbon dioxide being present in an amount so that said ratio of hydrogen to carbon dioxide is no greater than 15, said mixture being moisture-free;

holding said assembly at temperature and under atmosphere for a period sufficient to effect an acceptable brazed joint; and cooling said assembly to room temperature.

2. A process according to claim 1 wherein the ratio of hydrogen to carbon dioxide is maintained between 1 and 7.

3. A process according to claim 1 wherein the ratio of hydrogen to carbon dioxide is maintained between 1 and 5.

4. A process according to claim 1 wherein said ratio of hydrogen to carbon dioxide is controlled to produce in situ a moisture content in the heating zone of the furnace of at least 0.25% by volume.

5. A process according to claim 4 wherein said ratio of hydrogen to carbon dioxide is controlled to produce in situ a moisture content of from 0.25% to 0.5% by volume.

6. A process according to claim 1 wherein the hydrogen and carbon dioxide contents are controlled to provide a hydrogen to moisture ratio in the heating zone of the furnace of at least 3.0.

7. A process according to claim 6 wherein the hydrogen and carbon dioxide contents are controlled so the hydrogen to moisture ratio in the heating zone of the furnace is between 3.0 and 14.

\* \* \* \* \*